W. HORISK.
HORSE-BLANKETS.
No. 195,371. Patented Sept. 18, 1877.
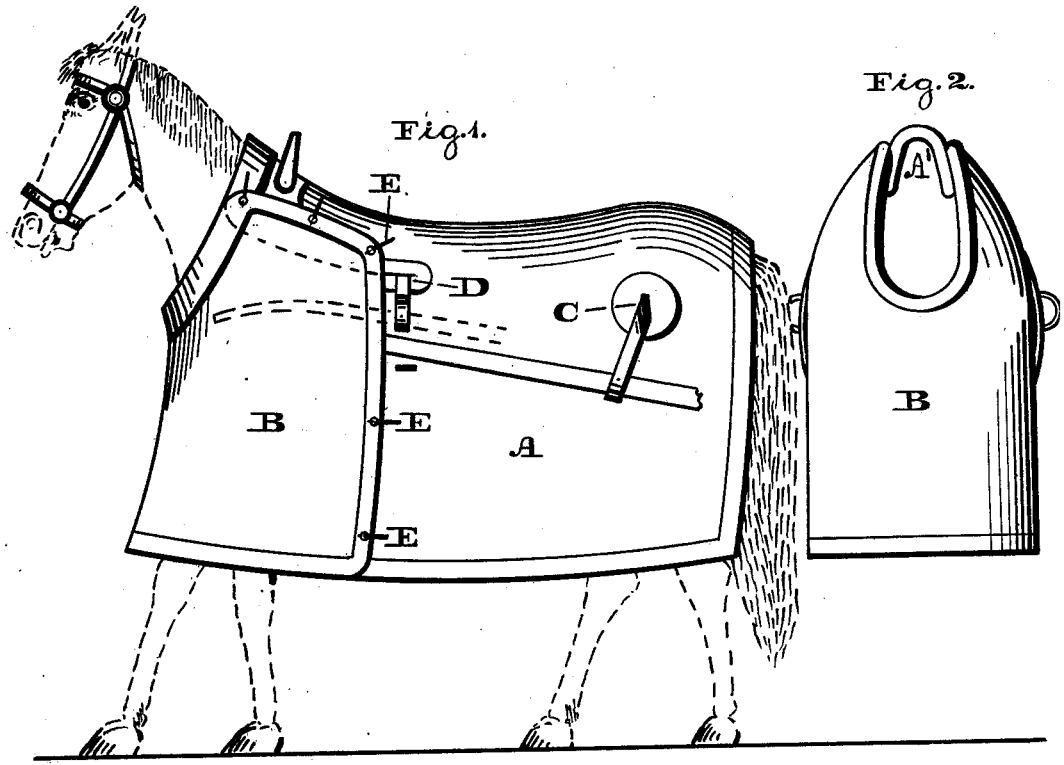
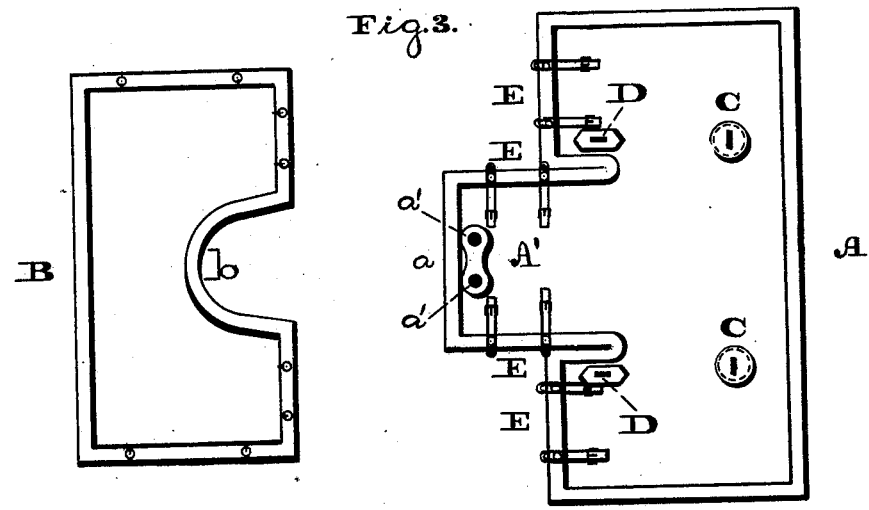
Witnesses:
Lewis F. Brous
A. P. Grant
Inventor:
Wm H Horisk
by John A. Wiedersheim
Attorney.

UNITED STATES PATENT OFFICE.

WILLIAM HORISK, OF PHILADELPHIA, PENNSYLVANIA.

IMPROVEMENT IN HORSE-BLANKETS.

Specification forming part of Letters Patent No. 195,371, dated September 18, 1877; application filed February 17, 1877.

*To all whom it may concern:*

Be it known that I, WILLIAM HORISK, of the city and county of Philadelphia, and State of Pennsylvania, have invented a new and useful Improvement in Horse-Blankets, which improvement is fully set forth in the following specification and accompanying drawings, in which—

Figure 1 is a side view of the horse-blanket embodying my invention. Fig. 2 is a front view thereof. Fig. 3 is a top view, the parts being separated and spread.

Similar letters of reference indicate corresponding parts in the several figures.

My invention relates to improvements in the class of animal-blankets having a front part which is detachably connected to the body part thereof, whereby the exposed front portion of the body and shoulders of the animal will be protected, and provision is made for adjusting the blankets to animals of different size.

The invention consists of the body part formed at its forward end with an extension, which is adapted to fit well up and over the neck of the animal, whereby the front part of the blanket may be attached to the sides of the extension and to the front end of the body part. The blanket will properly fit the neck, and the locomotion of the animal will not be impeded. The front of the shafts and traces does not interfere with the removal of the front and body parts of the blanket, and the hames may be passed through the extension, thus securing the blanket on the animal and preventing the falling off or shifting of the blankets.

It also consists in constructing the blanket so that when it is placed on the animal the shafts and traces will be on the outside of the body part of the blanket.

Referring to the drawings, A represents the body part of the blanket, which is to fit over the back and sides of the animal, and B represents another part, which is detachable, and is what I term the "front" part of the blanket, for covering the front portion of the body and shoulders of the animal.

The center of the forward end of the body part A is formed with an extension, A', which is of such length that when the blanket is on the animal said extension will fit well up and over the neck of the animal, reaching to the top of the hames or collar.

The center of what may be called the rear or upper end of the front part B is cut away, as at $b$, so that said part may fit well up on the under side of the neck, and reach the sides of the extension A'.

In the sides of the part A, near the rear thereof, there are formed openings C, for the passage of the holdbacks of the harness, and near the front thereof there are formed openings or slits D, for the passage of the back-strap.

In order to connect the body part A and front part B, I provide fastenings E, which, being in the form of straps and buckles, also admit of adjusting the blanket to animals of various sizes.

In the extension A' there are openings $a'$, through which will be passed the top ends of the hames.

When the blanket is placed on the animal the parts are in position as shown in Fig. 1, the part B being attached to the sides of the extension A' and front end of the part B, the main portion of the harness being under the blanket, the holdbacks and back-strap protruding through the part A, the shafts being outside of the parts A B, and the traces under the part B and over or outside of the part A, the hames protruding through the extension A', whereby the blanket does not interfere with said parts, and vice versa, and the back, sides, and neck of the animal will be entirely covered.

It will also be seen that the entire blanket may be readily applied to and removed from the animal.

By disengaging the holdbacks and back-strap, the blanket may be rolled from rear to front to the shoulders of the animal, and by releasing the fastenings E the part B and part A may be entirely removed.

Having thus described my invention, what I claim as new, and desire to secure by Letters Patent, is—

1. The body part A, formed with a forward extension, A', in combination with the detachable front part B, having cut-away portion b, substantially as and for the purpose set forth.

2. The body part A, provided with hold-back-openings C and back-strap openings D, in combination with the part B, whereby the traces and shafts will be on the outside of the part A, substantially as and for the purpose set forth.

WILLIAM HORISK.

Witnesses:
 JOHN A. WIEDERSHEIM,
 J. W. HAMPTON, Jr.